US008544040B2

(12) United States Patent
Gossweiler, III et al.

(10) Patent No.: US 8,544,040 B2
(45) Date of Patent: Sep. 24, 2013

(54) SYSTEM AND METHOD FOR DISPLAYING MULTIMEDIA EVENTS SCHEDULING INFORMATION

(75) Inventors: Richard Carl Gossweiler, III, Sunnyvale, CA (US); Marisa Bauer, Fremont, CA (US); John Wayne Blackburn, Newcastle, WA (US); David A. Brown, Mountain View, CA (US); Neha Gupta, San Jose, CA (US); Timothy Dharma Heilman, Palo Alto, CA (US); Manish Gordhan Patel, Mountain View, CA (US); David Scott Reiss, Manhattan Beach, CA (US); Mehran Sahami, Palo Alto, CA (US); Maricia Scott, Mountain View, CA (US); Thomas H. Taylor, Redmond, WA (US); Alice Tull, Cupertino, CA (US); Mark Wagner, Clyde Hill, WA (US); Lucy Congyun Zhang, Union City, CA (US); Daniel John Zigmond, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 174 days.

(21) Appl. No.: 11/618,640

(22) Filed: Dec. 29, 2006

(65) Prior Publication Data
US 2008/0158229 A1 Jul. 3, 2008

(51) Int. Cl.
*G06F 13/00* (2006.01)
(52) U.S. Cl.
USPC .................. 725/37; 725/39; 725/45; 725/53
(58) Field of Classification Search
USPC ........ 725/39, 43, 53, 40, 45, 52, 37; 715/700
See application file for complete search history.

(56) References Cited

U.S. PATENT DOCUMENTS

| 5,319,452 A | 6/1994 | Funahashi |
| 5,550,576 A | 8/1996 | Klosterman ...................... 348/6 |

(Continued)

FOREIGN PATENT DOCUMENTS

| EP | 1126701 A1 | 8/2001 | ............. H04N 5/445 |
| EP | 1387583 A1 | 2/2004 | ............. H04N 7/173 |

(Continued)

OTHER PUBLICATIONS

International Search Report for International Application No. PCT/US07/088246, dated Apr. 3, 2008.

(Continued)

*Primary Examiner* — Jivka Rabovianski
(74) *Attorney, Agent, or Firm* — Morgan, Lewis & Bockius LLP

(57) ABSTRACT

A system for displaying information may include memory, one or more processors, and one or more modules stored in memory. The one or more modules are configured for execution by the one or more processors and may include instructions for: presenting a subset of a collection of data on a first grid having a first axis corresponding to units of time and a second axis, the collection of data comprising data representing time-bounded events; presenting a second grid having first and second axes corresponding to the first and second axes of the first grid, the second grid corresponding to a larger portion of the collection of data than the subset presented on the first grid; and presenting a user moveable window for selecting a portion of the second grid, and selecting the subset presented on the first grid in accordance with a current position of the window.

32 Claims, 12 Drawing Sheets

(56) References Cited

U.S. PATENT DOCUMENTS

| | | | |
|---|---|---|---|
| 5,623,613 A * | 4/1997 | Rowe et al. | 715/841 |
| 5,793,888 A | 8/1998 | Delanoy | |
| 6,005,565 A | 12/1999 | Legall et al. | 345/327 |
| 6,025,837 A | 2/2000 | Matthews, III et al. | 345/327 |
| 6,034,677 A * | 3/2000 | Noguchi et al. | 715/719 |
| 6,034,683 A | 3/2000 | Mansour et al. | 345/339 |
| 6,064,062 A | 5/2000 | Bohn | 250/237 R |
| 6,128,009 A | 10/2000 | Ohkura et al. | 345/327 |
| 6,177,931 B1 | 1/2001 | Alexander et al. | |
| 6,184,878 B1 | 2/2001 | Alonso et al. | 345/327 |
| 6,222,540 B1 | 4/2001 | Sacerdoti | |
| 6,240,555 B1 | 5/2001 | Shoff et al. | 725/110 |
| 6,275,229 B1 | 8/2001 | Weiner et al. | |
| 6,289,170 B1 | 9/2001 | Nagano et al. | |
| 6,301,579 B1 | 10/2001 | Becker | |
| 6,357,043 B1 | 3/2002 | Ellis et al. | 725/61 |
| 6,499,138 B1 | 12/2002 | Swix et al. | 725/38 |
| 6,600,501 B1 | 7/2003 | Israel et al. | 345/810 |
| 6,690,391 B1 | 2/2004 | Proehl et al. | 345/720 |
| 6,707,454 B1 | 3/2004 | Barg et al. | |
| 6,742,184 B1 | 5/2004 | Finseth et al. | 725/52 |
| 6,756,997 B1 | 6/2004 | Ward, III et al. | |
| 6,769,128 B1 | 7/2004 | Knee et al. | 725/43 |
| 6,839,705 B1 | 1/2005 | Grooters | 707/4 |
| 6,943,793 B2 | 9/2005 | Bowser et al. | |
| 6,950,989 B2 | 9/2005 | Rosenzweig et al. | |
| 6,983,478 B1 | 1/2006 | Grauch et al. | |
| 6,996,782 B2 | 2/2006 | Parker et al. | 715/764 |
| 7,013,478 B1 | 3/2006 | Hendricks et al. | |
| 7,079,142 B2 | 7/2006 | Chiu et al. | |
| 7,188,156 B2 | 3/2007 | Bertram et al. | |
| 7,325,198 B2 | 1/2008 | Adcock et al. | 715/722 |
| 7,373,652 B1 * | 5/2008 | Bayrakeri et al. | 725/53 |
| 7,421,421 B2 | 9/2008 | Newbold et al. | |
| 7,454,777 B1 * | 11/2008 | Nishikawa et al. | 725/151 |
| 7,493,303 B2 | 2/2009 | Newbold et al. | |
| 7,505,038 B2 | 3/2009 | Bell et al. | |
| 7,552,459 B2 | 6/2009 | Klosterman et al. | 725/42 |
| 7,606,819 B2 | 10/2009 | Audet et al. | |
| 7,694,236 B2 | 4/2010 | Gusmorino et al. | |
| 7,698,657 B2 | 4/2010 | Gemmell et al. | |
| 7,788,080 B2 | 8/2010 | Graham et al. | |
| 7,788,592 B2 | 8/2010 | Williams et al. | |
| 7,800,615 B2 | 9/2010 | MacPherson | |
| 7,801,784 B2 | 9/2010 | Bandman et al. | |
| 7,831,601 B2 | 11/2010 | Oral et al. | |
| 7,835,543 B2 | 11/2010 | Yoshinaga et al. | |
| 7,937,309 B2 | 5/2011 | Bandman et al. | |
| 7,944,445 B1 | 5/2011 | Schorr et al. | |
| 8,010,579 B2 | 8/2011 | Metsatahti et al. | |
| 8,019,155 B2 | 9/2011 | Hibino et al. | |
| 2001/0011373 A1 * | 8/2001 | Inoue | 725/50 |
| 2002/0042916 A1 | 4/2002 | Mineyama | 725/39 |
| 2002/0044144 A1 * | 4/2002 | Inoue | 345/204 |
| 2002/0052864 A1 | 5/2002 | Yamamoto | 707/1 |
| 2002/0067379 A1 * | 6/2002 | Kenyon et al. | 345/838 |
| 2002/0073424 A1 | 6/2002 | Ward, III et al. | |
| 2002/0112237 A1 | 8/2002 | Kelts | 725/39 |
| 2002/0129368 A1 | 9/2002 | Schlack et al. | 725/46 |
| 2002/0129376 A1 | 9/2002 | Kitsukawa et al. | 725/110 |
| 2003/0033296 A1 | 2/2003 | Rothmuller et al. | |
| 2003/0038831 A1 | 2/2003 | Engelfriet | 345/719 |
| 2003/0113040 A1 | 6/2003 | Nishiyama et al. | 382/305 |
| 2003/0120373 A1 | 6/2003 | Eames | |
| 2003/0126600 A1 | 7/2003 | Heuvelman | 725/35 |
| 2003/0149988 A1 | 8/2003 | Ellis et al. | |
| 2004/0002987 A1 | 1/2004 | Clancy et al. | 707/101 |
| 2004/0004617 A1 | 1/2004 | Street et al. | |
| 2004/0031058 A1 | 2/2004 | Reisman | 725/112 |
| 2004/0125137 A1 | 7/2004 | Stata et al. | |
| 2004/0154040 A1 | 8/2004 | Ellis | 725/58 |
| 2004/0255296 A1 | 12/2004 | Schmidt et al. | 718/100 |
| 2004/0267897 A1 | 12/2004 | Hill et al. | 709/217 |
| 2005/0057566 A1 | 3/2005 | Githens et al. | |
| 2005/0071323 A1 | 3/2005 | Gabriel et al. | |
| 2005/0076092 A1 | 4/2005 | Chang et al. | 709/217 |
| 2005/0076361 A1 * | 4/2005 | Choi et al. | 725/45 |
| 2005/0086207 A1 | 4/2005 | Heuer et al. | |
| 2005/0091596 A1 | 4/2005 | Anthony et al. | |
| 2005/0102634 A1 * | 5/2005 | Sloo | 715/823 |
| 2005/0134945 A1 | 6/2005 | Gallagher | |
| 2005/0144190 A1 | 6/2005 | Wada | |
| 2005/0172315 A1 | 8/2005 | Chen | 725/39 |
| 2005/0210145 A1 | 9/2005 | Kim et al. | 709/231 |
| 2005/0228735 A1 | 10/2005 | Duquette | |
| 2005/0235321 A1 * | 10/2005 | Ahmad-Taylor | 725/56 |
| 2005/0273833 A1 | 12/2005 | Soinio | 725/113 |
| 2005/0278737 A1 | 12/2005 | Ma et al. | 725/40 |
| 2005/0278741 A1 * | 12/2005 | Robarts et al. | 725/46 |
| 2006/0020962 A1 | 1/2006 | Stark et al. | 725/32 |
| 2006/0031199 A1 | 2/2006 | Newbold et al. | |
| 2006/0036639 A1 | 2/2006 | Bauerle et al. | |
| 2006/0064716 A1 | 3/2006 | Sull et al. | 725/37 |
| 2006/0146436 A1 | 7/2006 | Goodwin et al. | 360/69 |
| 2006/0155757 A1 | 7/2006 | Williams et al. | |
| 2006/0156237 A1 | 7/2006 | Williams et al. | |
| 2006/0156246 A1 | 7/2006 | Williams et al. | |
| 2006/0173824 A1 | 8/2006 | Bensky et al. | |
| 2006/0174269 A1 | 8/2006 | Hansen-Turton | |
| 2006/0253869 A1 | 11/2006 | Boyer et al. | 725/51 |
| 2007/0005563 A1 | 1/2007 | Aravamudan et al. | 707/2 |
| 2007/0073894 A1 | 3/2007 | Erickson et al. | 709/230 |
| 2007/0083522 A1 | 4/2007 | Nord et al. | 707/10 |
| 2007/0106693 A1 | 5/2007 | Houh et al. | |
| 2007/0107019 A1 | 5/2007 | Romano et al. | 725/80 |
| 2007/0112578 A1 | 5/2007 | Randle et al. | 705/1 |
| 2007/0118852 A1 | 5/2007 | Calderwood | 725/38 |
| 2007/0157222 A1 | 7/2007 | Cordray et al. | 725/13 |
| 2007/0157232 A1 * | 7/2007 | Dunton et al. | 725/37 |
| 2007/0250855 A1 | 10/2007 | Quinn-Jacobs et al. | |
| 2008/0022310 A1 | 1/2008 | Poling et al. | |
| 2008/0082578 A1 | 4/2008 | Hogue et al. | 707/104.1 |
| 2008/0104058 A1 | 5/2008 | Billmaier et al. | 707/5 |
| 2008/0104529 A1 | 5/2008 | Cravens et al. | |
| 2008/0201740 A1 | 8/2008 | Boyer et al. | 725/39 |
| 2008/0240560 A1 | 10/2008 | Hibino et al. | |
| 2008/0270449 A1 | 10/2008 | Gossweiler et al. | 707/102 |
| 2008/0282291 A1 | 11/2008 | Henty | 725/44 |
| 2009/0033664 A1 | 2/2009 | Hao et al. | |
| 2010/0031193 A1 | 2/2010 | Stark et al. | 715/810 |
| 2010/0135643 A1 | 6/2010 | Fleming | 386/117 |

FOREIGN PATENT DOCUMENTS

| | | | |
|---|---|---|---|
| JP | 2003-032568 | 1/2003 | |
| WO | WO 2005/101842 A1 | 10/2005 | H04N 7/173 |

OTHER PUBLICATIONS

International Search Report and Written Opinion, PCT/US2008/061307, Sep. 4, 2008, 9 pages.

Microsoft Computer Dictionary, Fifth Edition, Microsoft Press, 2002, 3 pgs.

Google, Office Action, Japanese Patent Application 2009-544203, Aug. 22, 2012, 3 pgs.

Google, Office Action, CN 200780051900.7, Mar. 20, 2012, 4 pgs.

Google Inc., Office Action, CN 200780051900.7, Oct. 23, 2012, 5 pgs.

Google Inc., Office Action, CN 200780051900.7, Mar. 24, 2011, 6 pgs.

* cited by examiner

SYSTEM AND METHOD FOR DISPLAYING MULTIMEDIA EVENTS SCHEDULING INFORMATION

TECHNICAL FIELD

The disclosed embodiments relate generally to the presentation of multimedia events scheduling information, and in particular, to a system and method of searching and presenting results related to multimedia events scheduling information.

BACKGROUND

Many web pages provide a schedule of upcoming programs of televisions shows, and many of those web pages display the schedule of upcoming shows on a grid having a horizontal axis and a vertical axis. Typically, the horizontal axis of the grid corresponds to time (e.g., time of the day, days of the week, etc.) and the vertical axis corresponds to television channels. A typical way to navigate through this grid is by scrolling horizontally in time to past or future shows and by scrolling up and down to view different channels.

Many times, if a user wants to search for a television show on some of these web pages, no search engine is provided, and therefore the search must be performed manually by scrolling the program grid until either a user-sought item is found or the user gives up in frustration. Furthermore, when a search engine is provided, the search results appear as a list of televisions shows that correspond to the search query.

SUMMARY

In accordance with some embodiments of the present invention, a method of displaying information includes presenting a subset of a collection of data on a first grid having a first axis corresponding to units of time and a second axis. The collection of data includes data representing time-bounded events. The method also includes presenting a second grid having first and second axes corresponding to the first and second axes of the first grid. The second grid corresponds to a larger portion of the collection of data than the subset presented on the first grid. The method further includes presenting a user moveable window for selecting a portion of the second grid, and selecting the subset presented on the first grid in accordance with a current position of the window.

In accordance with some embodiments of the present invention, a system for displaying information includes memory, one or more processors, and one or more modules stored in memory. The one or more modules are configured for execution by the one or more processors and include instructions for: presenting a subset of a collection of data on a first grid having a first axis corresponding to units of time and a second axis, the collection of data comprising data representing time-bounded events; presenting a second grid having, first and second axes corresponding to the first and second axes of the first grid, the second grid corresponding to a larger portion of the collection of data than the subset presented on the first grid; and presenting a user moveable window for selecting a portion of the second grid, and selecting the subset presented on the first grid in accordance with a current position of the window.

In accordance with some embodiments of the present invention, a computer program product for use in conjunction with a computer system includes a computer readable storage medium and a computer program mechanism embedded therein. The computer program mechanism comprises instructions for: presenting a subset of a collection of data on a first grid having a first axis corresponding to units of time and a second axis, the collection of data comprising data representing time-bounded events; presenting a second grid having first and second axes corresponding to the first and second axes of the first grid, the second grid corresponding to a larger portion of the collection of data than the subset presented on the first grid; and presenting a user moveable window for selecting a portion of the second grid, and selecting the subset presented on the first grid in accordance with a current position of the window.

BRIEF DESCRIPTION OF THE DRAWINGS

Like reference numerals refer to corresponding parts throughout the drawings.

DETAILED DESCRIPTION OF THE INVENTION

Figure 1:
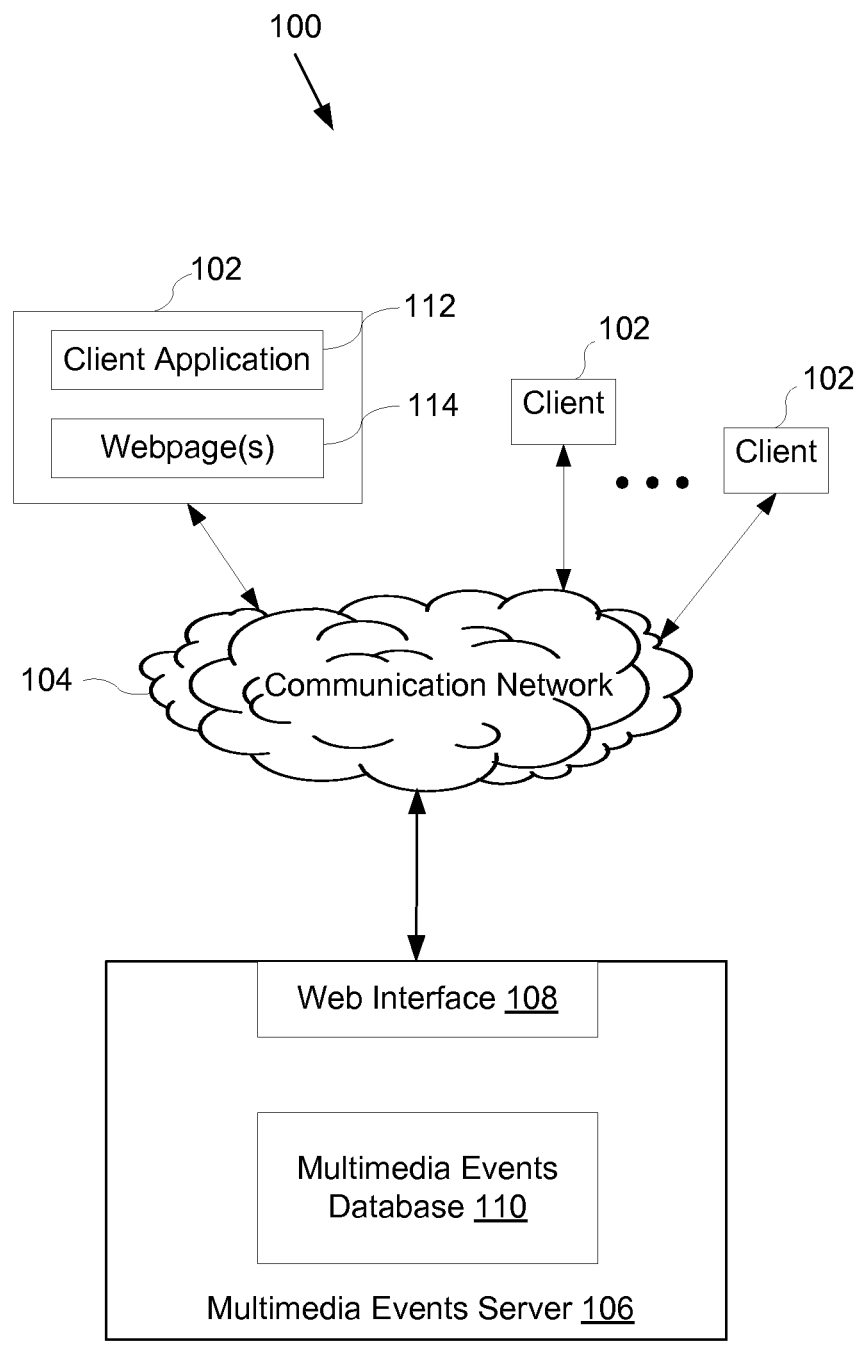
FIG. 1 is a block diagram of a system for implementing some embodiments of the present invention.

FIG. 1 is a block diagram of a system 100 for implementing some embodiments of the present invention. One or more client computers or devices 102 (hereinafter "clients") can be connected to a communication network 104. The communication network 104 may be connected to a server 106. The server 106 may include a web interface 108 and a multimedia events database 110. The web interface 108 facilitates communication between the server 106 and the communication network 104. The web interface 108 allows for the transfer of information from the server 106 to the communication network 104 to be displayed on a client application 112 of a client 102. The multimedia events database 110 stores information associated with multimedia events. In some embodiments, these events may time-bounded events, such as television shows scheduled for broadcast on a particular day, at a particular time.

The client 102 may be any of a number of devices (e.g. a computer, an internet kiosk, a personal digital assistant, a cell phone, a desktop computer, or a laptop computer) and can include a client application 112 that permits a user to view web pages 114 or other documents or information. The client application 112 may be a software application that permits a user to interact with the client 102 and/or network resources to perform one or more tasks. For example, the client application 112 may be a web browser (e.g., Firefox, Internet Explorer or Safari) or other type of application that permits a user to search for, browse, and/or use resources, such as one or more web pages 114, on the client 102 and/or accessible via the communication network 104.

The communication network 104 may be a local area network (LAN), a metropolitan area network, a wide area network (WAN), such as an intranet, an extranet, or the Internet, or any combination of such networks. It is sufficient that the communication network 104 provides communication capability between the clients 102 and the server 106. In some embodiments, the communication network 104 uses Hyper-Text Transport Protocol (HTTP) to transport information using the Transmission Control Protocol/Internet Protocol (TCP/IP). The HTTP permits client computers to access various resources available via the communication network 104. The various embodiments of the invention, however, are not limited to the use of any particular protocol. The term "resource" as used throughout this specification refers to any document, object, information item, set of information, or service that is accessible via a Uniform Resource Locator (URL) and can be, for example, a web page, a text or word processing document, an email message, a transcribed voice message, a database, an image, a computational object, or other type of file.

Figure 2:
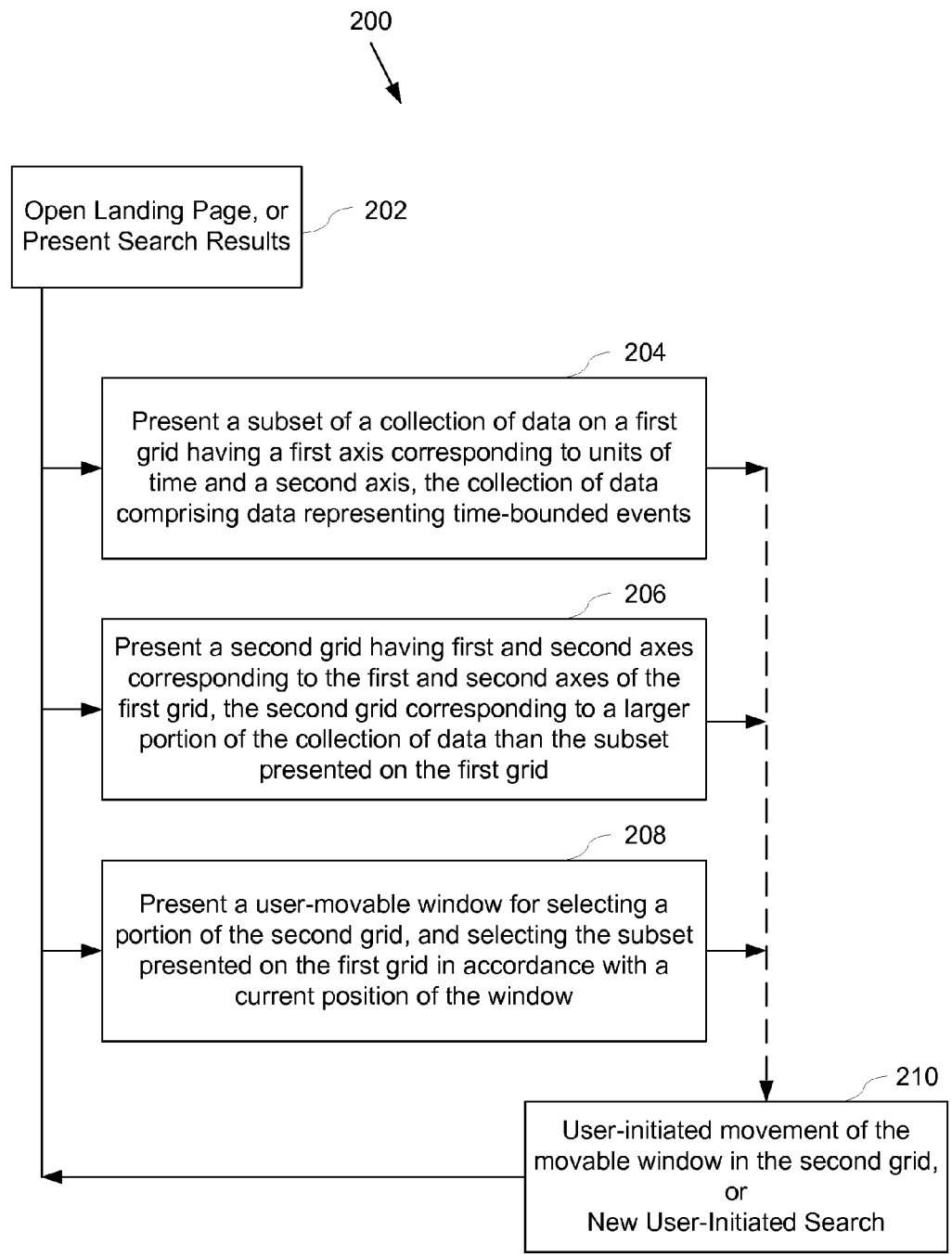
FIG. 2 is a flow diagram of a process for presenting a collection of data according to an embodiment of the present invention.

FIG. 2 is a flow diagram of a process 200 for presenting a collection of data according to an embodiment of the present invention. The process 200 occurs at a client device, on a client application that permits a user to view web pages or other documents or information. The process 200 begins by a user-initiated action on the client application, which results in an opening of a "landing page" or a presentation of search results 202. For example, the user may enter a particular Uniform Resource Locator (URL) for a specific web page, which results in the opening of a landing page. A landing page is typically the home page or an entryway page for an online service. As another example, the user may enter a search query into an online search engine, such as the Google search engine, which results in the presentation of search results.

The process 200 may comprise operations that occur simultaneously. One of these operations steps is to present a subset of a collection of data on a first grid having a first axis and a second axis 204. The first axis corresponds to units of time, and the collection of data includes data representing time-bounded events. Examples of time-bounded events are television programs, movies (e.g., movies broadcast by television signal, satellite or cable), and sporting events (e.g., sporting events broadcast by television signal, satellite or cable) that have a scheduled start time and duration. A second operation is to present a second grid having first and second axes that correspond to the first and second axes of the first grid 206. The second grid corresponds to a larger portion of the collection of data than the subset that is presented on the first grid. In other words, the second grid displays a larger portion of the collection of data. However, even the second grid may display a subset of the collection. A third operation is to present a user-movable window for selecting a portion of the second grid and for selecting the subset presented on the first grid in accordance with a current position of the window 208.

In some embodiments, if a landing page is already opened or if search results are already presented (e.g., in a search results page), the process 200 may begin by a user-initiated movement of the movable window in the second grid, or a new user-initiated search 210. The user-movable window is within the second grid and movable in any planar direction within the second grid. As the user-movable window is moved within the second grid, the events being displayed on the first grid change accordingly. In other words, the portion that is contained within the user-movable window of the second grid is displayed on the first grid in a larger view.

Figure 3A:
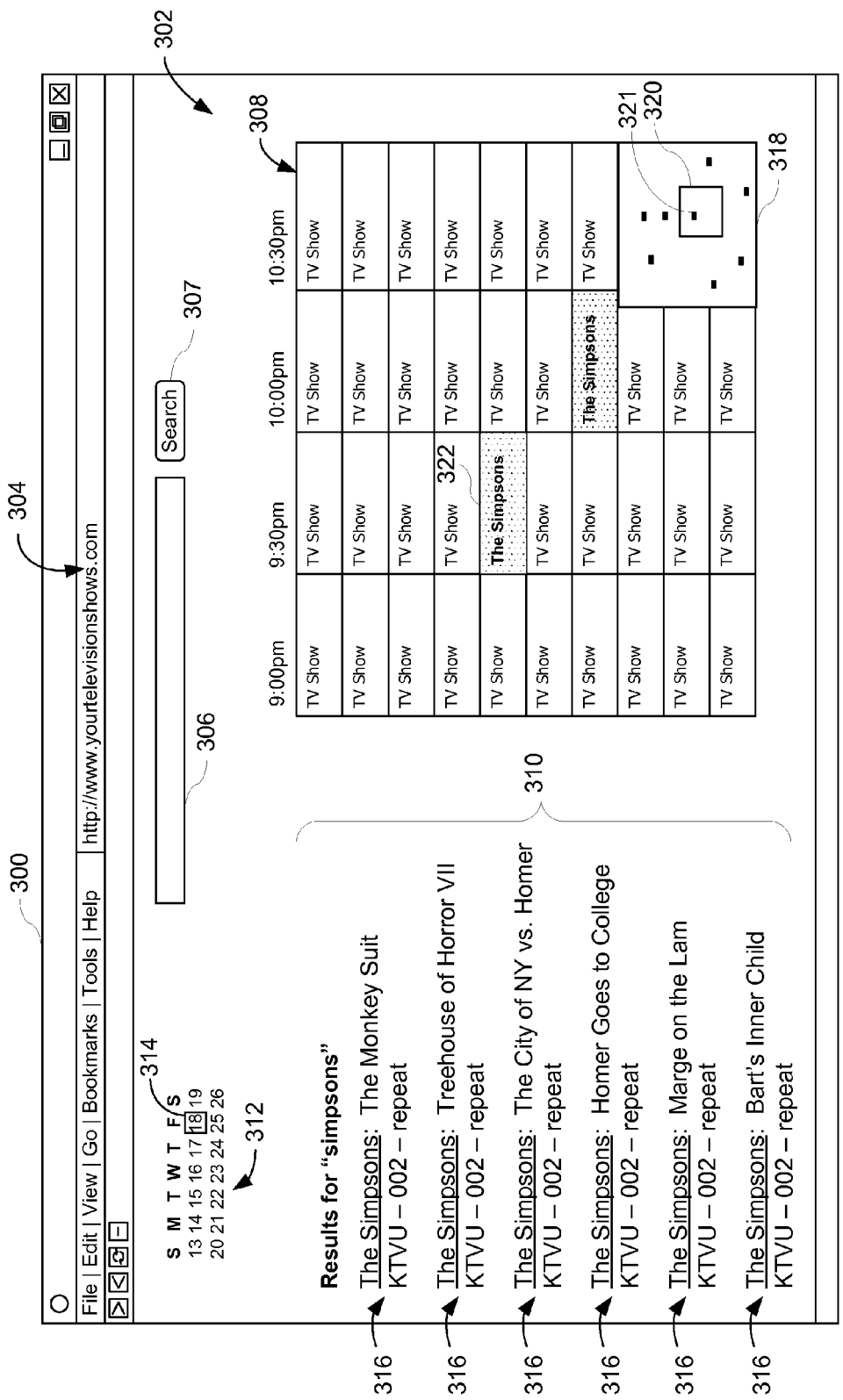
FIG. 3A is a schematic screenshot of a web browser presenting a collection of data according to an embodiment of the present invention.

FIG. 3A is a schematic screenshot of a web browser 300 presenting a web page 302 that displays a collection of data according to an embodiment of the present invention. The web browser 300 represents a typical web browser and can be any type of browser that permits a user to display and interact with web pages or other documents or information. The web browser 300 comprises a URL field 304 for entering the URL of any web page that a user wants to display, as well as for displaying the URL of the web page currently being displayed. The user may begin the process 200 as shown in FIG. 2 by entering a specific URL in the URL field 304. As illustrated in this figure, the web browser 300 displays an exemplary web page 302. Web page 302 comprises a search field 306 with a corresponding search button 307 (for initiating a search for information corresponding to the search query entered in the search field 306), a main map 308, and a results panel 310.

Figure 3B:
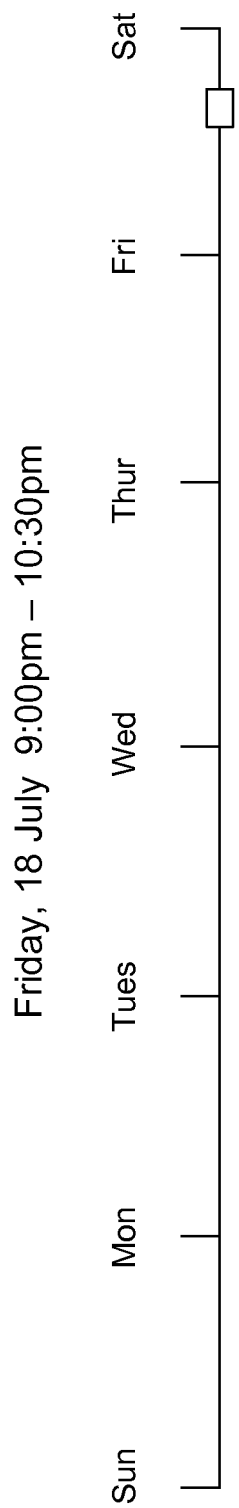
FIG. 3B depicts a second embodiment of the calendar portion of the schematic screenshot of FIG. 3A.

The main map 308 may be a grid representing scheduled multimedia events being broadcast on a particular day. As illustrated in FIG. 3A, the main map 308 is a grid displaying television programs being broadcasted on a particular day. A calendar 312 displays a grid representing a range of dates. The date of the events shown in main map 308 is indicated by a highlighted date 314 in the calendar 312. The date 314 may be highlighted by surrounding it with a box, as shown in FIG. 3A, or the text of the date may be displayed in a different color than the other dates, or the "whitespace" around the date may be a different color than the whitespace around the other dates in the calendar 312. In other embodiments, the calendar may also be represented in a different manner. For example, the calendar may be represented by a horizontal bar displaying the days of the week as shown in FIG. 3B.

As mentioned above, the main map 308 may be a grid representing scheduled multimedia events (also called time-bounded events), such as television shows, being broadcast on a particular day. The information shown on the grid includes basic information (sometimes called "low resolution data" or "low resolution information") about the scheduled events, such as event names (e.g., show names and/or episode titles for television shows). In some embodiments, when a user hovers a pointer over an event name within the main map 308, additional information (sometimes called "medium resolution data" or "medium resolution information") may be displayed. Such medium resolution data may include channel, time of broadcast, duration or end time, and a summary or short description of the event corresponding to the user selected event name. Furthermore, in some embodiments, when a user selects an event within the main map 308, another webpage with more detailed information (sometimes called "high resolution data" or "high resolution information") about the event may open. Additionally, when a user selects an event from results 316 in the list of results in the results panel 310, the detailed high resolution information for the user-selected event may also be displayed. The user may select an event from results 316 by selecting (e.g., clicking on) an event name in the results 316, such as the title of a television show or the title of the television show episode.

A database structure for storing the low resolution data, medium resolution data and the high resolution data is described below with reference to FIGS. 6A and 6B.

In the embodiment shown in FIG. 3A, the main map 308 has two axes. The first (horizontal) axis represents time of day and the second (vertical) axis represents television channels. A miniature map 318 (hereinafter a "MiniMap") is also displayed. In some embodiments, the MiniMap 318 partially overlaps and is displayed within the main map 308. However, in other embodiments, the MiniMap may be displayed in any location on webpage 302. The MiniMap 318 includes two axes, both corresponding to the same axes of the main map 308. A first (horizontal) axis of the MiniMap 318 represents time of day and a second (vertical) axis of the MiniMap 318 represents television channels. In some embodiments, the second axis of the first grid (e.g., main map 308) and the second grid (e.g., MiniMap 318) corresponds to content genres.

The MiniMap 318 includes a dynamic scrolling feature 320, also called a user-movable window. Unlike the scrolling features that are common to typical web browsers or web pages that only move up and down, the dynamic scrolling feature 320 is movable in any planar direction within the MiniMap 318. The dynamic scrolling feature 320 is used to select portions of the MiniMap 318 to be displayed in a larger view on the main map 308. As illustrated in FIG. 3A, for example, the contents within dynamic scrolling feature 320 of the MiniMap 310 are displayed in a larger view on the main map 308. If a user moves the dynamic scrolling feature 320 in any direction within the MiniMap 318, the contents within the dynamic scrolling feature 320 are changed and therefore, the contents being displayed on the main map 308 are also changed accordingly.

In some embodiments, a user may enter a search term in the search field 306. The search conducted is a search for multimedia events, such as television shows, occurring within a predefined time period. The search results are displayed as a list of results 316 in the results panel 310. The search results are also highlighted within both the main map 308 and the MiniMap 318. The term "highlight" is used here to mean displaying in a visually distinctive manner, such as changing one or more of the following: background color, changing background fill pattern, bolding, underlining, font color, font, etc. Furthermore, the term "highlight" means generating formatting information for displaying something (e.g., a specified portion of text) in a distinctive manner.

For example, if a user wants to perform a search for comedy shows, the user would enter "comedy" in the search field 306 and select search button 307. The results of that search are displayed in a grid, which shows the schedule of televisions shows being broadcast over a period of time. Additionally the shows that fall into the comedy category would be highlighted on the grid. Optionally, television shows that match the search query may also be listed in the results panel 310. The results of the search are also displayed in the main map 308 as highlighted cells (e.g., cell 322) and in the MiniMap 318 as mini highlighted cells 321. In some embodiments, when a user hovers a pointer over one of the mini highlighted cells 321, corresponding labels are displayed on the vertical and horizontal axes of the MiniMap 318.

Figure 3C:
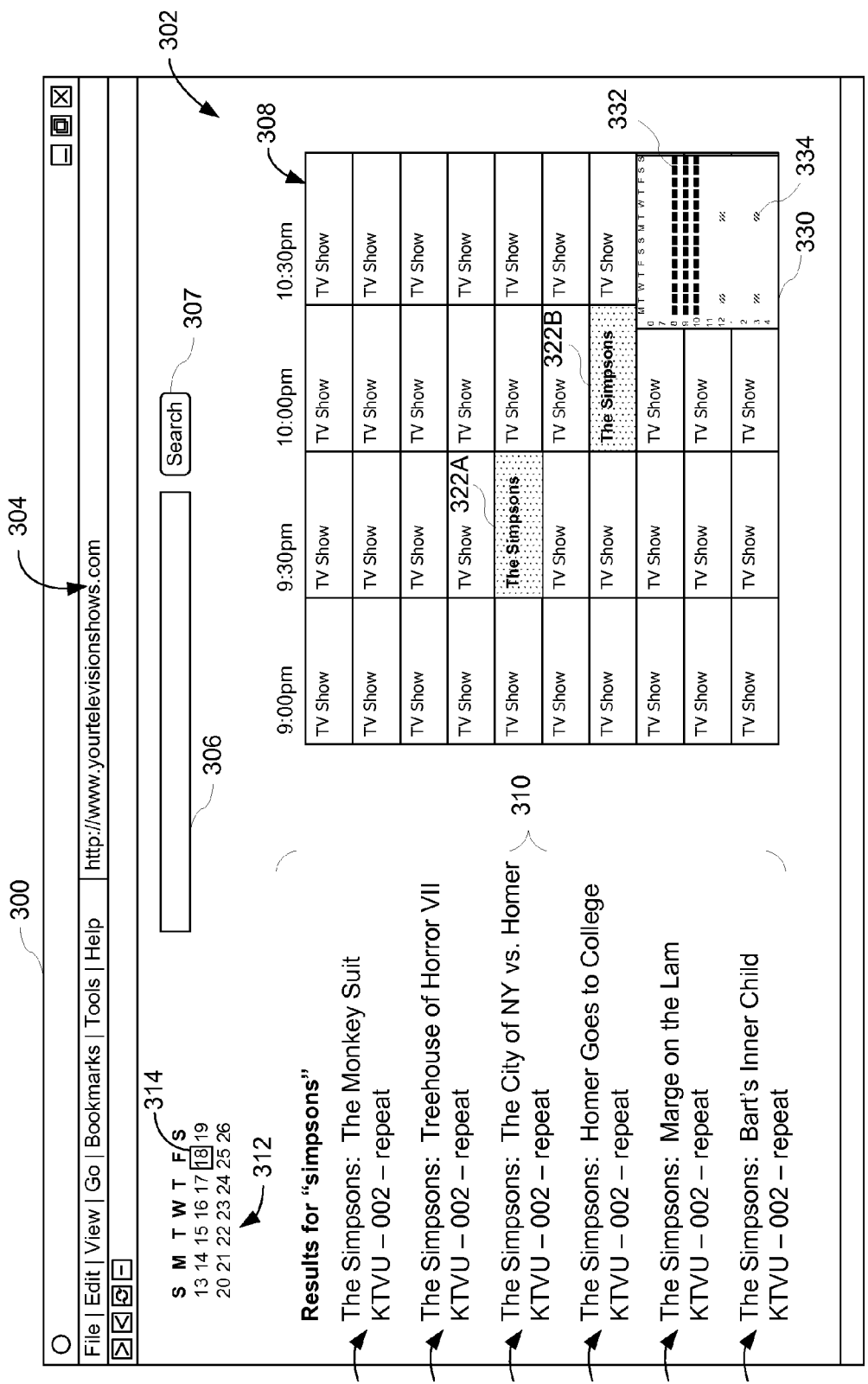
FIG. 3C is a schematic screenshot of a web browser presenting a collection of data according to another embodiment of the present invention.

FIG. 3C is a schematic screenshot of another embodiment of web browser 300 presenting a web page 302 that displays a collection of data according to an embodiment of the present invention. Similar to the previously described embodiment, the web browser 300 represents a typical web browser and can be any type of browser that permits a user to display and interact with web pages or other documents or information. The web browser 300 includes many of the aspects of the previous embodiment as shown in FIG. 3A.

In the embodiment depicted by FIG. 3C, a MiniMap 330 is displayed. The MiniMap 330 corresponds to the main map 308 in a different way than the MiniMap 318 of FIG. 3A. Here, the MiniMap 330 includes two axes, both of which represent time. A first axis represents days of the week and a second axis represents time of day. For example, as illustrated in FIG. 3C, a user may perform a search by entering "comedy" into the search field 306. The results of that search would display televisions shows that fall into the comedy category. Such television shows may be listed in the results panel 310, as also shown in FIG. 3A. The results of the search are also displayed in the main map 308 as highlighted cells 322A and 322B representing the events that are related to comedy programs. Additionally, the MiniMap 330 displays comedy events occurring over a period of many days. The MiniMap 330 displays the corresponding search results as search results 332 and related events 334.

The embodiment depicted in FIG. 3C provides a different representation of the search results than the embodiment depicted in FIG. 3A. Here, a user would be able to see that comedy events reoccur at certain times over a period of several days.

It is noted that the main map 308 may be considered to be a virtual window that is positioned over a portion of the collection of data available for viewing. When a user selects an item in the MiniMap 330, the user is effectively selecting a set of events that are then displayed in the main map 308. The time range and the channel or collection range for the main map 308 are updated to include the user selected item in the MiniMap 330. The main map 308 will also display "neighboring items," that fall within the time range and channel or collection range for the main map 308. Another way to view this is that the virtual window represented by the main map 308 is repositioned over the collection data in response to user selection of an item (e.g., a search result 332 or a related event 334) in the MiniMap 330, even though the main map 308's display position in the web page 302 remains unchanged. In this way the MiniMap 330 is a tool that the user can use to dynamically change and reposition the display of the main map 308.

Figure 3D:
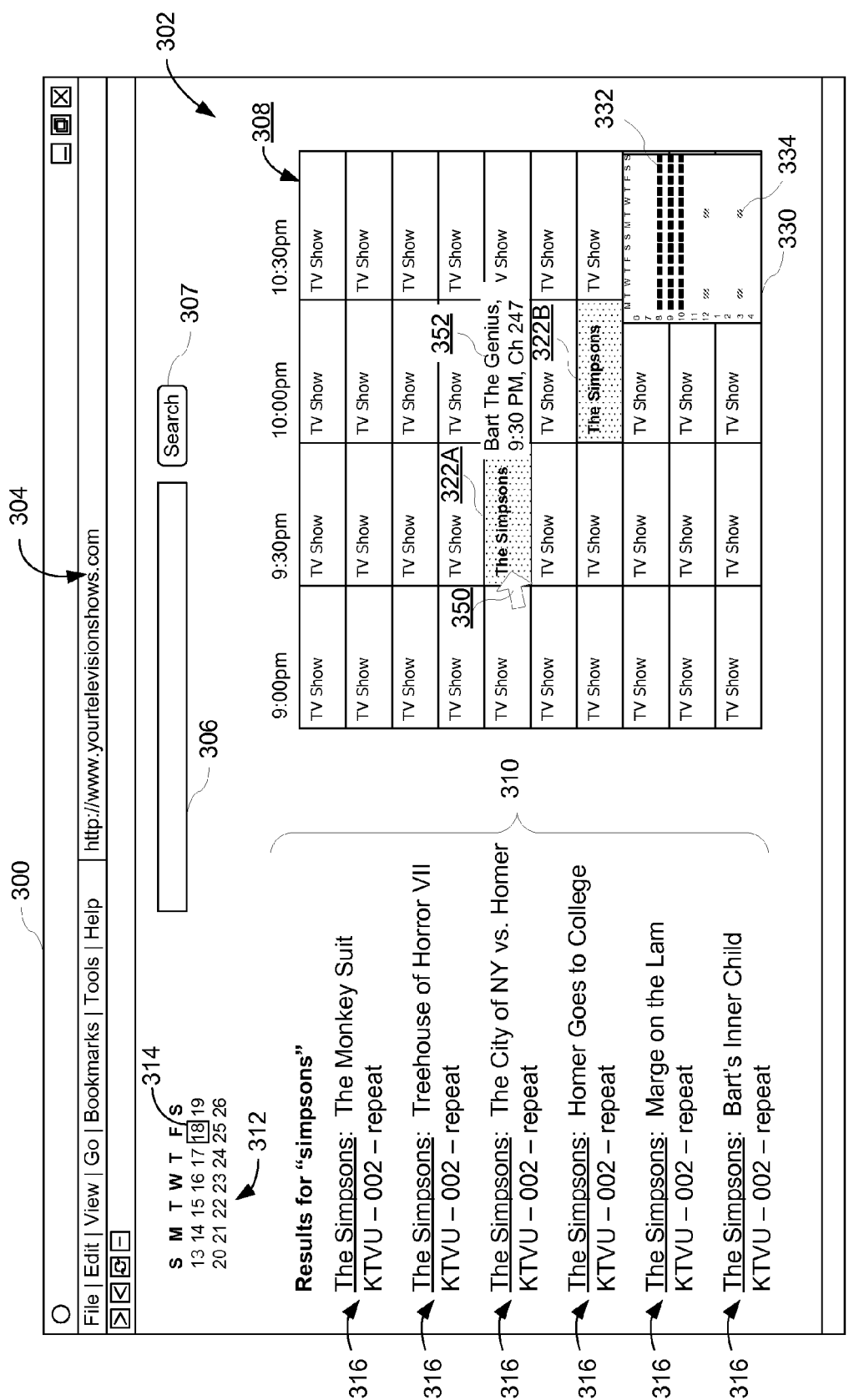
FIG. 3D is a schematic screenshot of a web browser presenting a collection of data according to yet another embodiment of the present invention.

FIG. 3D depicts the display of medium resolution information 352 when the user hovers a pointer 350 over an event title (e.g., a television show title) in the main map 308, such as the event title in highlighted cell 322A. In some embodiments, the display of the medium resolution information ceases immediately or shortly after the user moves the pointer 350 away from the event title.

Additionally, in some embodiments, if a user hovers a pointer over one of the search results 332 or related events 334 in the MiniMap 330, additional information (e.g. medium resolution information), such as event title and time of broadcast, may be displayed.

Figure 3E:
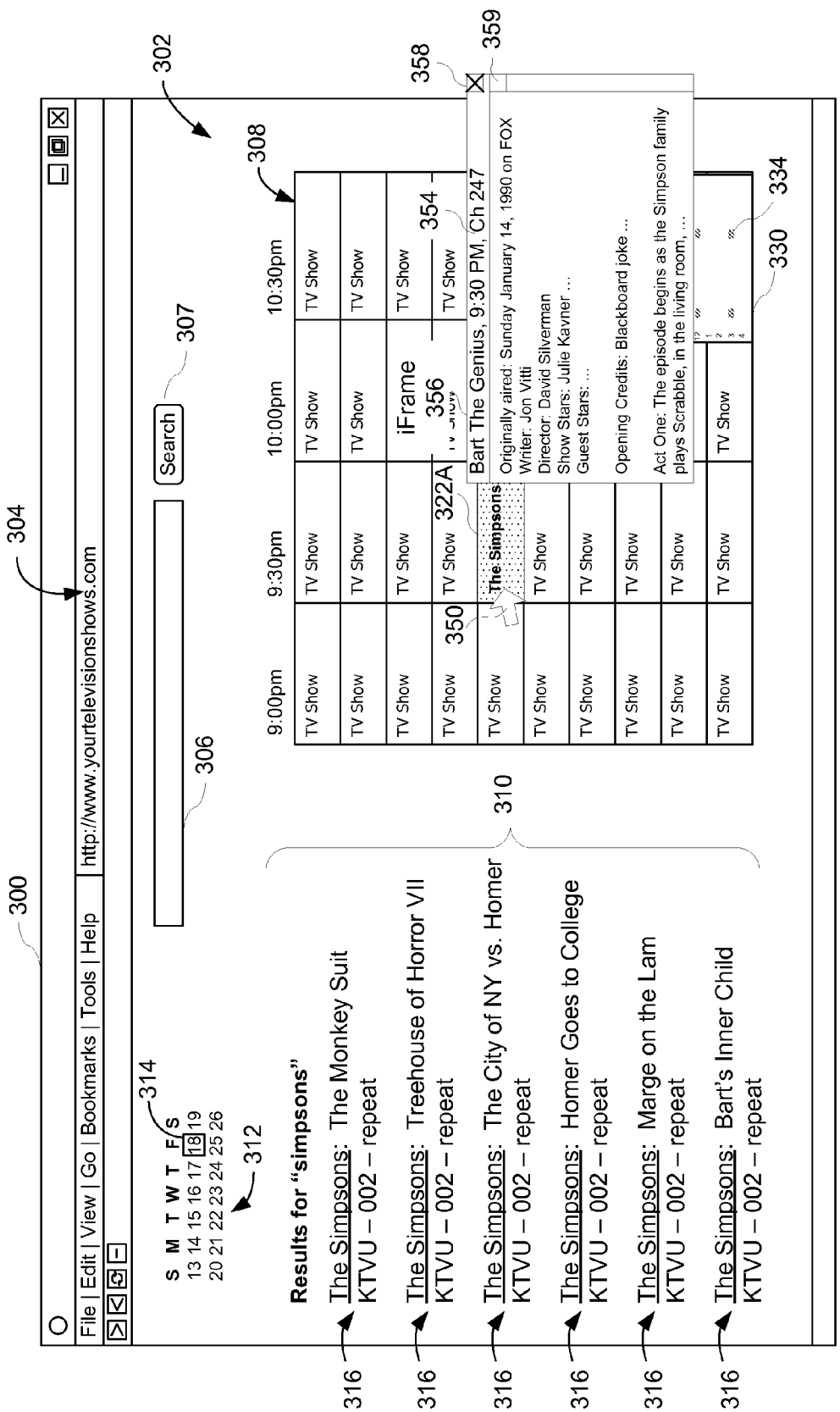
FIG. 3E is a schematic screenshot of a web browser presenting a collection of data according to still yet another embodiment of the present invention.

FIG. 3E depicts the display of high resolution information 354 in an iframe 356 (also called an inline frame) when the user selects (e.g., clicks on) an event title (e.g., a television show title) using a mouse of other user-controller pointer. The iframe partially blocks the landing page or search results page 360 that includes the main grid 308. Additional high resolution information may be displayed when a user manipulates scroll bar 359 by moving it in a vertical motion. In other embodiments, as an alternative to providing a scroll bar to present additional high resolution information, a "more" link may be presented in the iframe 356. If a user selects the "more" link, the webpage may present additional high resolution information in the iframe 356. In other embodiments that use other types of browsers that do no implement inline frames such as iframe 356, an equivalent implementation may be utilized for the same purpose. In some embodiments, the iframe 356 is closed and the display of the high resolution information 354 ceases when the user closes the iframe 356 (by clicking on a close frame icon 358) or when the user clicks on the landing page or search results page.

Figure 3F:
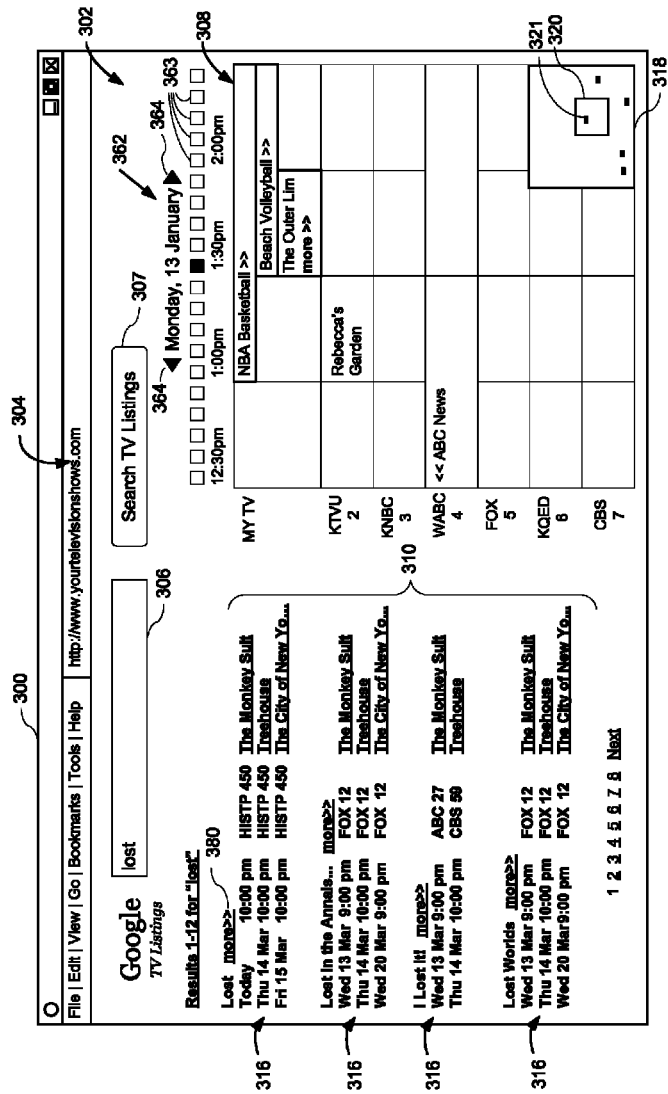
FIG. 3F is a schematic screenshot of a web browser presenting a collection of data according to another embodiment of the present invention.

FIG. 3F is a schematic screenshot of a web browser presenting a collection of data according to another embodiment of the present invention. According to this embodiment, a webpage 360 includes many of the same items as seen in the earlier figures, such as a URL field 304, a search field 306 with a corresponding search button 307, a main map 308, and a results panel 310. The webpage 360 may also contain a MiniMap 318 or MiniMap 330 (also shown in FIGS. 3C and 3D). In some embodiments, the webpage 360 may also include a time bar 362. The time bar 362 may be used to navigate to various times of the day by selecting a respective box 363 within the time bar 362 or by selecting one of the arrows 364 within the time bar 362. In some embodiments, the boxes 363 and arrows 364 may be represented by any other symbol or shape. In some embodiments, time bar 362 may be another representation of the calendar 312 as shown in the previous figures, or the calendar as shown in FIG. 3B.

As shown in FIG. 3F, in some embodiments, when a user performs a search by entering a query in the search field 306 and selecting the search button 307, the results panel 310 lists corresponding results listing show or program title, as well as additional information such as time and date of broadcast of the shows or programs. If a user selects the more link 380, the webpage may display high resolution information regarding one or more selected shows or programs.

In some embodiments, the main map 308 may show all channels regardless of the search results. In other embodiments, the main map 308 may show predefined channels, such as channels that the user has previously identified or selected, which may be known as the user's "favorite channels." In yet other embodiments, the main map 308 may show only those channels that contain at least one show that matches the search query.

Figure 4:
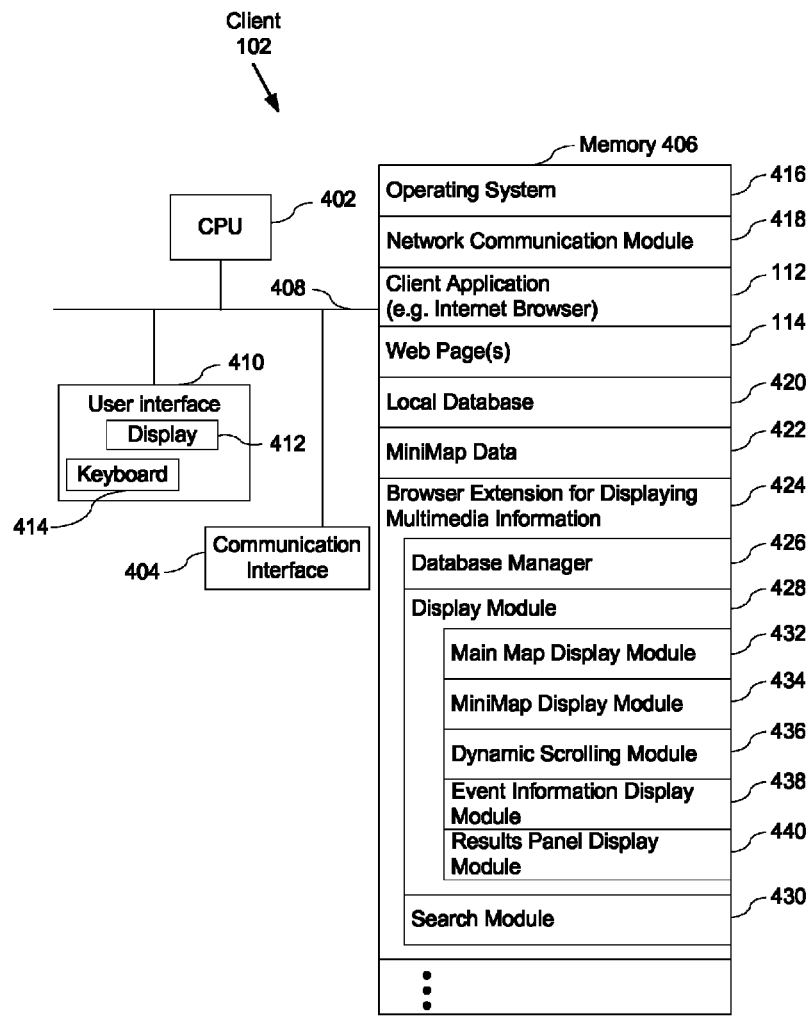
FIG. 4 is a block diagram of an exemplary client computer or device in accordance with some embodiments of the present invention.

FIG. 4 is a block diagram of an exemplary client computer or device in accordance with some embodiments of the present invention. The client 102 typically includes one or more processing units (CPUs) 402, one or more network or other communications interfaces 404, memory 406, and one or more communication buses 408 for interconnecting these components. The communication buses 408 may include circuitry (sometimes called a chipset) that interconnects and controls communications between system components. The client 102 optionally may include a user interface 410 comprising a display device 412 and a keyboard 414. Memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 406 may optionally include one or more storage devices remotely located from the CPU(s) 402. Memory 406, or alternatively one or more storage devices (e.g., one or more non-volatile storage devices) within memory 406, includes a computer readable storage medium. In some embodiments, memory 406, or the computer readable storage medium of memory 406, stores the following programs, modules and data structures, or a subset thereof:

an operating system 416 that includes procedures for handling various basic system services and for performing hardware dependent tasks;
a network communication module 418 that is used for connecting the client 102 to other computers via the one or more communication network interfaces 404 and one or more communication networks, such as the Internet, other wide area networks, local area networks, metropolitan area networks, and so on;
a client application 112 (e.g., a browser application) that can permit a user to interact with the client 102 as described above;
one or more web pages 114 that may be displayed by the client application 112;
a local database 420 for storing information, such as multimedia information;
MiniMap data 422; and
a browser extension for displaying multimedia information 424.

In some embodiments, the browser extension for displaying multimedia information 424 includes a database manager 426, a display module 428 and a search module 430. The database manager 426 handles information being stored on the local database. The search module 430 is for conveying a search query entered by a user to search engine or other online service, such as the server 106 described elsewhere in this document.

The display module 428 facilitates the display of information on two grids, a main grid and a MiniMap grid, as described above. In some embodiments, the display module includes a main map display module 432, a MiniMap display module 434, a dynamic scrolling module 436, an event information display module 438, and a results panel display module 440.

The main map display module 432 and the MiniMap display module 434 determines how the main map and MiniMap are displayed on the web page. The dynamic scrolling module 436 controls the function of the dynamic scrolling feature 320 of the MiniMap 318. The event information display module 438 enables the display of information when a user selects an event that is displayed on the main map. The results panel display module 440 displays the results of a search query.

Figure 5:
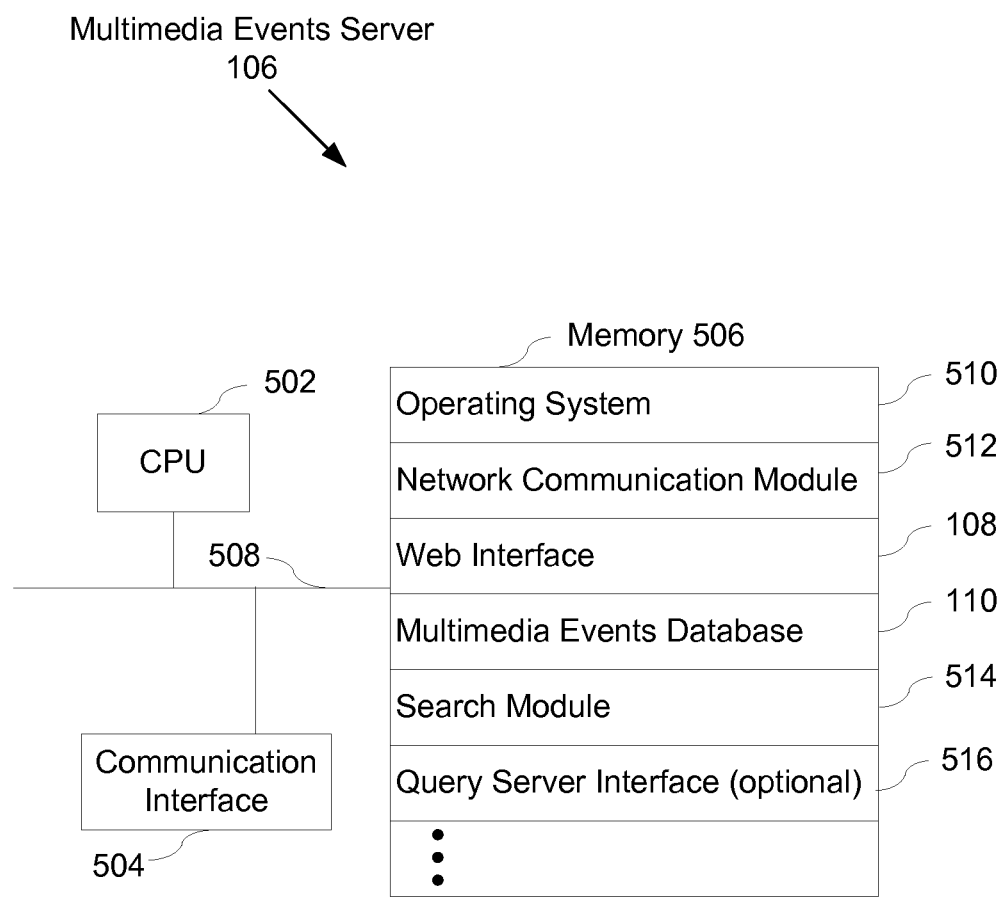
FIG. 5 is a block diagram of an exemplary server in accordance with some embodiments of the present invention.

FIG. 5 is a block diagram of an exemplary server 106 in accordance with some embodiments of the present invention. The server 106 typically includes one or more processing units (CPUs) 502, one or more network or other communication interfaces 504, memory 506, and one or more communication buses 508 for interconnecting these components. The communication buses 508 may include circuitry (sometimes called a chipset) that interconnects and controls communications between system components. The server 106 optionally may include a user interface (not shown). Memory 506 includes high-speed random access memory, such as DRAM, SRAM, DDR RAM or other random access solid state storage devices; and may include non-volatile memory, such as one or more magnetic disk storage devices, optical disk storage devices, flash memory devices, or other non-volatile solid state storage devices. Memory 506 may optionally include one or more storage devices remotely located from the CPU(s) 502. In some embodiments, memory 506 stores the following programs, modules, and data structures, or a subset thereof:

an operating system 510 that includes procedures for handling various basic system services and for performing hardware dependent tasks;

a network communication module 512 that is used for connecting the server 106 to other computers via the one or more communication network interfaces 504 and one or more communication networks, such as the Internet, other wide are networks, local area networks, metropolitan area networks, and so on;

a web interface 108;

a multimedia events database 110;

a search module 514; and an optional query server interface 516.

As described above, the web interface 108 facilitates communication between the server 106 and the communication network 104 and allows for the transfer of information from the server 106 to the communication network 104 to be displayed on a client application 112 of a client 102. The multimedia events database 110 stores information associated with multimedia events. The server 106 may also comprise a search module 514 for conducting searches of the multimedia events database 110.

In some embodiments, memory 506 includes a query server interface 516. The query server interface 516 receives queries from another server, such as a query server, and returns search results to that other server. For instance, a query server may direct a search query from a user to multiple databases, including the multimedia events database 110, and then send search results from one or more of those databases to the user.

Each of the above identified elements in FIGS. 4 and 5 may be stored in one or more of the previously mentioned memory devices, and corresponds to a set of instructions for performing a function described above. The above-identified modules or programs (i.e., sets of instructions) need not be implemented as separate software programs, procedures or modules, and thus various subsets of these modules may be combined or otherwise rearranged in various embodiments. In some embodiments, memory 406 and 506 may sore a subset of the modules and data structures identified above. Furthermore memory 406 and 506 may store additional modules and data structures not described above.

Although FIGS. 4 and 5 show respectively a client 102 and a server 106, the figures are intended more as functional descriptions of the various features which may be present in a client and set of servers than as a structural schematic of the embodiments therein. In practice, and as recognized by those of ordinary skill in the art, items shown separately could be combined and come items could be separated. For example, some items shown separately in FIG. 5 could be implemented on a single server and single items could be implemented by one or more servers. The actual number of server used to implement a server 106 and how features are allocated among them will vary from one implementation to another, and may depend in part on the amount of data traffic that the system must handle during peak usage periods as well as during average usage periods.

Figure 6A:
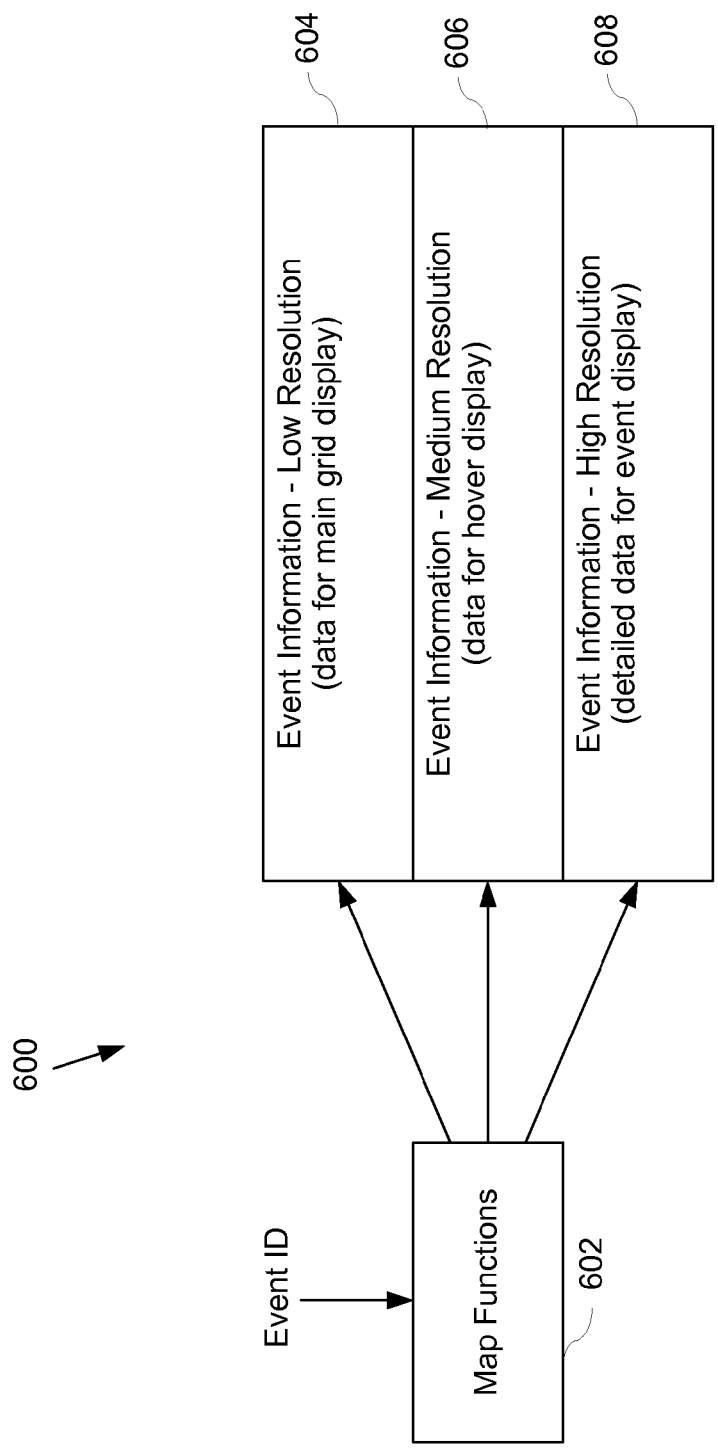
FIG. 6A is a block diagram of a database structure according to some embodiments of the present invention.

FIG. 6A is a block diagram of a database structure 600 according to some embodiments of the present invention. In some embodiments, database structure 600 applies, at least conceptually, to the multimedia events database 100 of the server 106. However, in some other embodiments, database structure 600 may also apply to the local database 420 of a respective client 102. One or more map functions 602 may be called upon to acquire information from the database 600. The database structure 600 includes storage for low resolution information 604, medium resolution information 606, and high resolution information 608. Each of these types of information which may be accessed by the server 106 for sending to a client 102 in response to a client request for information of that type.

Upon receiving a request, such as a search query, from a client, low resolution information corresponding to the request is acquired from the multimedia events database 110 and is sent to the client. The low resolution information is used to display basic information about multimedia events that correspond to the request. For example, the low resolution information sent to the client (or a portion of the low resolution information sent to the client) may be displayed in the main map 308 (FIG. 3) of a landing page or search results page, as described above. Since the main map 308 can only display events that fall within a currently specified time period, any low resolution information that is sent to the client, but which is for times earlier or later than the currently specified time period is not initially displayed on the main map 308. In other words, the client may prefetch low resolution information for events outside the currently specified time window. For example, if the beginning of the currently specified time window corresponds to the current time, the client may prefetch low resolution information for a next time window, immediately following the currently specified time window, so that the user will experience zero or almost zero latency when the user scrolls the time window of the main map "forward" (to a future time window). All the downloaded event information is stored in the local database 420 of the client (FIG. 4). When the user scrolls the time window backwards or forwards on the main map 308, prefetched low resolution already stored at the client can be immediately displayed on the main grid 308. Additionally, medium resolution information corresponding to the low resolution information being displayed on the main map may also be prefetched.

The medium resolution information is data that is displayed when a user hovers a pointer over a television show title that is being displayed on the main map. Therefore, if the medium resolution information for a particular event is prefetched, when the user hovers a pointer over the event title (e.g., a television show title), the medium resolution information is displayed without latency. Medium resolution information may include channel, duration, time of broadcast and other types of information about the television show.

The high resolution information is data that is displayed when a user selects an event title (e.g., a television show title) displayed on the main map 308. In some embodiments, the high resolution information is displayed in an iframe (also called an inline frame) that partially obscures the landing page or search results page, but leaves the landing page or search results page in place in the client application. See exemplary schematic screenshot in FIG. 3E. The user can return to the landing page or search results page by closing the iframe 356 or clicking on a portion of the landing page that is not covered by the iframe.

Figure 6B:
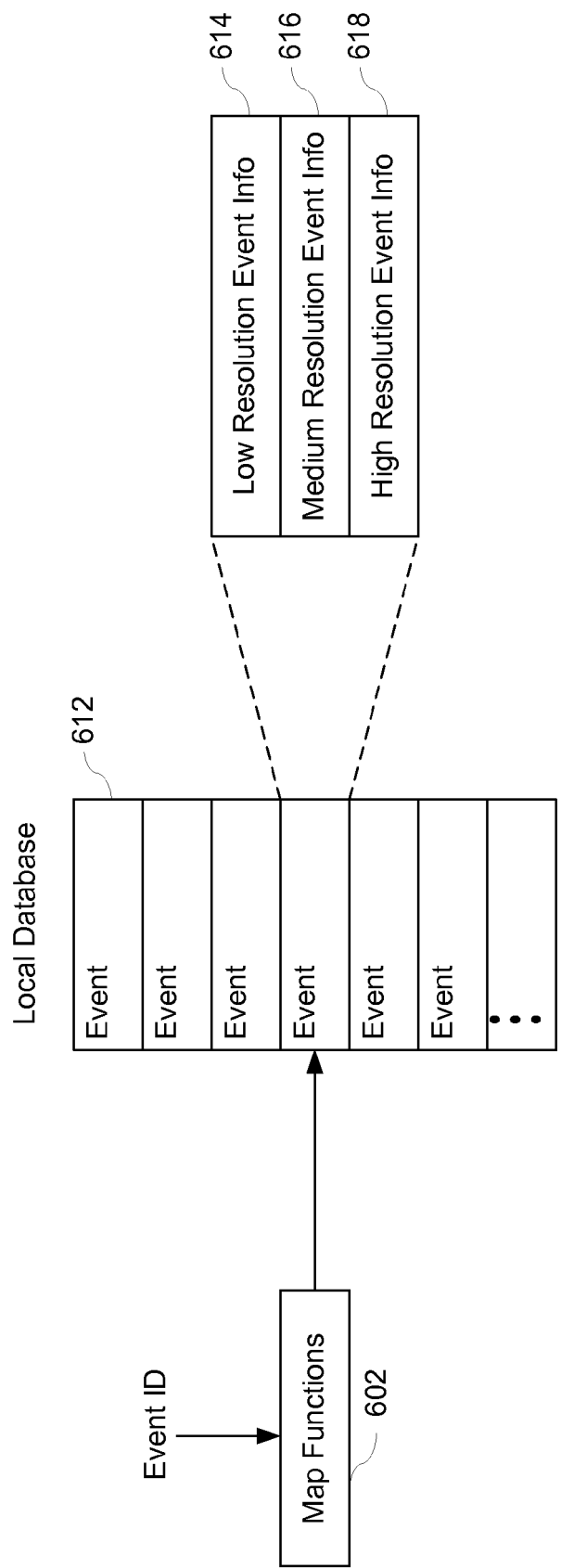
FIG. 6B is a block diagram of a database structure according to other embodiments of the present invention.

FIG. 6B is a block diagram of a database structure according to other embodiments of the present invention. For example, this database structure may be used in either the server 106, or a respective client 102, or both. In this embodiment, a multimedia events database or local database contain a set of events 612. The data representing an event may be found in the database by the use of one or more mapping functions on indices 602. For example, a respective mapping function or index may map an event identifier to an event record, or set of records, in the database. A respective event in the set of events has corresponding low resolution event information 614, medium resolution event information 616, and high resolution event information 618. While most events in the database may have all three sets of information, it is possible that some events in the database will be devoid of high resolution information 618, or even medium resolution information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of displaying program guide information, comprising:
    at a computer system having one or more processors and memory storing one or more programs for execution by the one or more processors:
    presenting a subset of a collection of program guide data on a first grid having a first axis corresponding to units of time and a second axis, the collection of program guide data comprising data representing time-bounded events;
    concurrently, while presenting data in the first grid, displaying a second grid that partially overlaps the first grid, the second grid having first and second axes the same as the first and second axes of the first grid, the second grid has a greater number of the time-bounded events in the collection of program guide data than the subset presented on the first grid and the second grid is concurrently displayed with the first grid on a screen; and
    presenting a user moveable window within the second grid for selecting a portion of the second grid, and updating the subset of the collection of program guide data concurrently presented on the first grid in accordance with the portion of the second grid selected by a current position of the user moveable window the selected portion of the second grid within the user movable window are displayed in a larger view on the first grid;
    wherein the second axis of the first and second grids corresponds to content genres.

2. The method of claim 1, wherein the time-bounded events comprise scheduled presentations of multimedia content.

3. The method of claim 1, wherein the collection of program guide data corresponds to television shows scheduled for broadcast in a predefined time period.

4. The method of claim 1, wherein the first grid occupies a display region larger than a display region of the second grid.

5. The method of claim 1, further comprising:
    responding to a user action of repositioning the user moveable window by changing the subset concurrently presented on the first grid in accordance with the repositioned user moveable window; and
    acquiring additional data from a server corresponding to the changed subset presented on the first grid.

6. The method of claim 5, wherein the additional data comprises additional information associated with the time-bounded events;
    the method including responding to user selection of a respective time-bounded event by displaying information included in the additional information.

7. A method of displaying program guide information, comprising:
    at a computer system having one or more processors and memory storing one or more programs for execution by the one or more processors:
    presenting a subset of a collection of program guide data on a first grid having a first axis corresponding to units of time and a second axis, the collection of program guide data comprising data representing time-bounded events;
    concurrently, while presenting data in the first grid, displaying a second grid that partially overlaps the first grid, the second grid having first and second axes the same as the first and second axes of the first grid, the second grid has a greater number of the time-bounded events in the collection of program guide data than the subset presented on the first grid and the second grid is concurrently displayed with the first grid on a screen; and
    presenting a user moveable window within the second grid for selecting a portion of the second grid, and updating the subset of the collection of program guide data concurrently presented on the first grid in accordance with the portion of the second grid selected by a current position of the user moveable window the selected portion of the second grid within the user movable window are displayed in a larger view on the first grid;
    wherein the collection of program guide data comprises data resulting from a search of a database in accordance with a search query, the second grid presenting search results from the search and the first grid presenting a subset of the search results in the second grid in accordance with a position of the user moveable window.

8. The method of claim 7, wherein the search query is a user specified search query.

9. The method of claim 7, wherein the search query comprises a predefined search query.

10. The method of claim 7, wherein the first grid occupies a display region larger than a display region of the second grid.

11. The method of claim 7, further comprising:
    responding to a user action of repositioning the user moveable window by changing the subset concurrently presented on the first grid in accordance with the repositioned user moveable window; and
    acquiring additional data from a server corresponding to the changed subset presented on the first grid.

12. The method of claim 11, wherein the additional data comprises additional information associated with the time-bounded events;
    the method including responding to user selection of a respective time-bounded event by displaying information included in the additional information.

13. A system for displaying program guide information, comprising:
    memory;
    one or more processors; and
    one or more modules stored in memory which, when executed by the one or more processors, cause the system to:
        present a subset of a collection of program guide data on a first grid having a first axis corresponding to units of time and a second axis, the collection of program guide data comprising data representing time-bounded events;
        concurrently display, while presenting data in the first grid, a second grid that partially overlaps the first grid, the second grid having, first and second axes the same as the first and second axes of the first grid, the second grid has a greater number of the time-bounded events in the collection of program guide data than the subset presented on the first grid and the second grid is concurrently displayed with the first grid on a screen; and present a user moveable window within the second grid for selecting a portion of the second grid, and updating the subset of the collection of program guide data concurrently presented on the first grid in accordance with the portion of the second grid selected by a current position of the user moveable window the selected portion of the second grid within the user movable window are displayed in a larger view on the first grid;

wherein the collection of program guide data comprises data resulting from a search of a database in accordance with a search query, the second grid presenting search results from the search and the first grid presenting a subset of the search results in the second grid in accordance with a position of the user moveable window.

14. The system of claim 13, wherein the time-bounded events comprise scheduled presentations of multimedia content.

15. The system of claim 13, wherein the search query is a user specified search query.

16. The system of claim 13, wherein the search query comprises a predefined search query.

17. The system of claim 13, wherein the modules, when executed, further cause the system to:
respond to a user action of repositioning the user moveable window by changing the subset concurrently presented on the first grid in accordance with the repositioned user moveable window; and
acquire additional data from a server corresponding to the changed subset presented on the first grid.

18. The system of claim 17, wherein the additional information includes information to be displayed when the user selects a respective time-bounded event of the first grid.

19. The system of claim 13, wherein the first grid occupies a display region larger than a display region of the second grid.

20. A non-transitory computer readable storage medium storing a computer program mechanism for execution by one or more processors of a computer system, the computer program mechanism comprising instructions for:
presenting a subset of a collection of program guide data on a first grid having a first axis corresponding to units of time and a second axis, the collection of program guide data comprising data representing time-bounded events;
concurrently, while presenting data in the first grid, displaying a second grid that partially overlaps the first grid, the second grid having first and second axes the same as the first and second axes of the first grid, the second grid has a greater number of the time-bounded events in the collection of program guide data than the subset presented on the first grid and the second grid is concurrently displayed with the first grid on a screen; and
presenting a user moveable window within the second grid for selecting a portion of the second grid, and updating the subset of the collection of program guide data concurrently presented on the first grid in accordance with the portion of the second grid selected by a current position of the user moveable window the selected portion of the second grid within the user movable window are displayed in a larger view on the first grid;
wherein the collection of program guide data comprises data resulting from a search of a database in accordance with a search query, the second grid presenting search results from the search and the first grid presenting a subset of the search results in the second grid in accordance with a position of the user moveable window.

21. The non-transitory computer readable storage medium of claim 20, wherein the time-bounded events comprise scheduled presentations of multimedia content.

22. The non-transitory computer readable storage medium of claim 20, wherein the search query is a user specified search query.

23. The non-transitory computer readable storage medium of claim 20, wherein the search query comprises a predefined search query.

24. The non-transitory computer readable storage medium of claim 20, wherein the computer program mechanism further comprises instructions for:
responding to a user action of repositioning the user moveable window by changing the subset concurrently presented on the first grid in accordance with the repositioned user moveable window; and
acquiring additional data from a server corresponding to the changed subset presented on the first grid.

25. The non-transitory computer readable storage medium of claim 24, wherein the additional information includes information to be displayed when the user selects a respective time-bounded event of the first grid.

26. The non-transitory computer readable storage medium of claim 20, wherein the first grid occupies a display region larger than a display region of the second grid.

27. A system for displaying program guide information, comprising:
memory;
one or more processors; and
one or more modules stored in memory which, when executed by the one or more processors, cause the system to:
present a subset of a collection of program guide data on a first grid having a first axis corresponding to units of time and a second axis, the collection of program guide data comprising data representing time-bounded events;
concurrently display, while presenting data in the first grid, a second grid that partially overlaps the first grid, the second grid having, first and second axes the same as the first and second axes of the first grid, the second grid has a greater number of the time-bounded events in the collection of program guide data than the subset presented on the first grid and the second grid is concurrently displayed with the first grid on a screen; and
present a user moveable window within the second grid for selecting a portion of the second grid, and updating the subset of the collection of program guide data concurrently presented on the first grid in accordance with the portion of the second grid selected by a current position of the user moveable window the selected portion of the second grid within the user movable window are displayed in a larger view on the first grid;
wherein the second axis of the first and second grids corresponds to content genres.

28. The system of claim 27, wherein the first grid occupies a display region larger than a display region of the second grid.

29. The system of claim 27, wherein the modules, when executed further cause the system to:

respond to a user action of repositioning the user moveable window by changing the subset concurrently presented on the first grid in accordance with the repositioned user moveable window; and acquire additional data from a server corresponding to the changed subset presented on the first grid.

30. A non-transitory computer readable storage medium storing a computer program mechanism for execution by one or more processors of a computer system, the computer program mechanism comprising instructions for:

presenting a subset of a collection of program guide data on a first grid having a first axis corresponding to units of time and a second axis, the collection of program guide data comprising data representing time-bounded events;

concurrently, while presenting data in the first grid, displaying a second grid that partially overlaps the first grid, the second grid having first and second axes the same as the first and second axes of the first grid, the second grid has a greater number of the time-bounded events in the collection of program guide data than the subset presented on the first grid and the second grid is concurrently displayed with the first grid on a screen; and presenting a user moveable window within the second grid for selecting a portion of the second grid, and updating the subset of the collection of program guide data concurrently presented on the first grid in accordance with the portion of the second grid selected by a current position of the user moveable window the selected portion of the second grid within the user movable window are displayed in a larger view on the first grid;

wherein the second axis of the first and second grids corresponds to content genres.

31. The non-transitory computer readable storage medium of claim 30, wherein the first grid occupies a display region larger than a display region of the second grid.

32. The non-transitory computer readable storage medium of claim 30, wherein the computer program mechanism further comprises instructions for:

responding to a user action of repositioning the user moveable window by changing the subset concurrently presented on the first grid in accordance with the repositioned user moveable window; and acquiring additional data from a server corresponding to the changed subset presented on the first grid.

* * * * *